(12) United States Patent
Noel et al.

(10) Patent No.: US 7,630,383 B2
(45) Date of Patent: Dec. 8, 2009

(54) SYNCHRONIZATION OF TIME STAMPS OF PEER DEVICES IN A COMMUNICATION NODE

(75) Inventors: Paul A. Noel, Naperville, IL (US); Jerry Stamatopoulos, North Aurora, IL (US); David A. Welch, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 590 days.

(21) Appl. No.: 11/092,330

(22) Filed: Mar. 29, 2005

(65) Prior Publication Data

US 2006/0222016 A1    Oct. 5, 2006

(51) Int. Cl.
*H04L 12/28* (2006.01)

(52) U.S. Cl. .................... 370/395.62; 370/503; 714/55; 714/744

(58) Field of Classification Search ................. 370/503, 370/395.62; 714/55, 744
See application file for complete search history.

(56) References Cited

U.S. PATENT DOCUMENTS

| | | | | |
|---|---|---|---|---|
| 7,212,537 B2 * | 5/2007 | Wybenga et al. | ................ | 370/401 |
| 7,363,495 B2 * | 4/2008 | Felt et al. | .................... | 713/170 |
| 2003/0067921 A1 * | 4/2003 | Sivalingham | ................ | 370/394 |
| 2004/0008661 A1 * | 1/2004 | Myles et al. | ................ | 370/350 |
| 2005/0259754 A1 * | 11/2005 | Ho et al. | ................ | 375/240.28 |

* cited by examiner

*Primary Examiner*—Seema S. Rao
*Assistant Examiner*—Sai-Ming Chan
(74) *Attorney, Agent, or Firm*—Duft, Bornsen & Fishman, LLP (57) ABSTRACT

Networks and methods are disclosed for synchronizing time stamps of peer devices. In one embodiment, a first communication node comprised of peer devices is connected to a second communication node. The first and second communication nodes communicate according to a protocol that requires monotonically increasing time stamps. When in operation, a peer device transmits a message to the second communication node with a time stamp. If the peer device receives an error response from the second communication node indicating that the time stamp does not comprise an increasing time stamp, then the peer device increases the time stamp. The peer device then transmits the message to the second communication node with the increased time stamp. This process continues each time the peer device receives an error response from the second communication node until the time stamp is increased sufficiently to comprise a monotonically increasing time stamp.

18 Claims, 7 Drawing Sheets

SYNCHRONIZATION OF TIME STAMPS OF PEER DEVICES IN A COMMUNICATION NODE

BACKGROUND OF THE INVENTION

1. Field of the Invention

The invention is related to the field of communications, and in particular, to synchronization of time stamps of peer devices in a communication node of a communication network.

2. Statement of the Problem

Wireless networks are one type of communication network that are growing in size and numbers of subscribers. Wireless networks may comprise CDMA networks, GSM networks, TDMA networks, UMTS networks, etc. Some wireless networks, such as 3G1X CDMA packet data networks, provide Internet-type features, such as web-surfing and email to subscribers. To provide these Internet-type features, the wireless network includes Packet Data Service Nodes (PDSN) that interface the wireless network with a packet data network, such as the Internet. A PDSN communicates with Packet Control Functions (PCF) in a Mobile Switching Center (MSC) in the wireless network. The PCFs establish and maintain sessions with the PDSN to interface the PDSN with the base stations of the wireless network.

Figure 1:
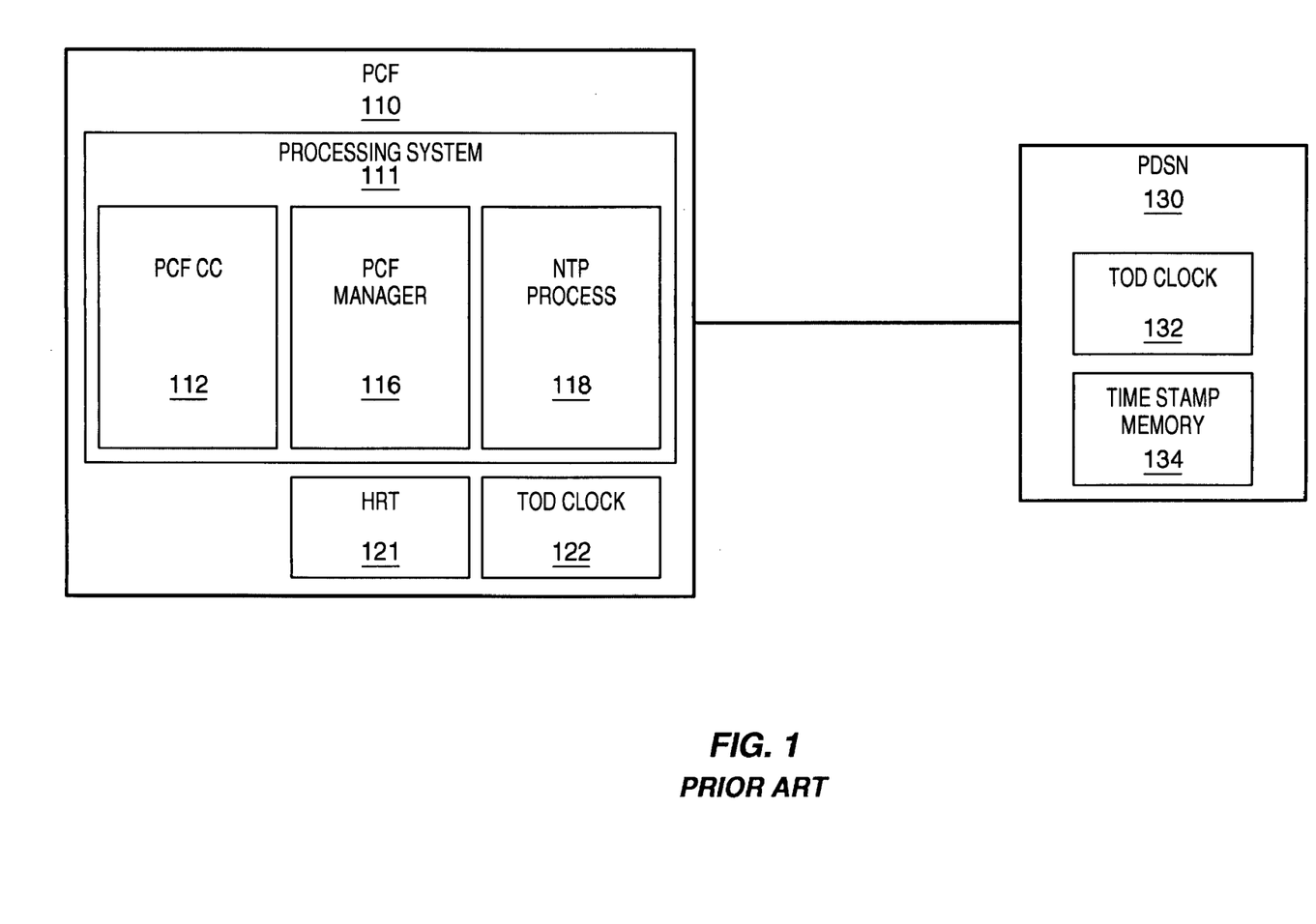
FIG. 1 illustrates a PCF connected to a PDSN in the prior art.

FIG. 1 illustrates a PCF 110 connected to a PDSN 130 in the prior art. PCF 110 includes a processing system 111, a high resolution timer (HRT) 121, and a time of day (TOD) clock 122. Processing system 111 executes a PCF call control (PCF CC) process 112, a PCF manager process 116, and an NTP process 118. PDSN 130 includes a TOD clock 132 and a time stamp memory 134 for storing previous time stamps.

PCF 110 and PDSN 130 communicate according to a messaging protocol, such as TIA/EIA/IS-2001, that requires PCF 110 to provide monotonically increasing time stamps in messages transmitted to PDSN 130. The messages include an ID field where a time stamp is inserted. When PCF 110 transmits a new message to PDSN 130, PCF 110 inserts a time stamp in the ID field of the new message. The time stamp is based on TOD clock 122. Time stamps are generally used to prevent replay attacks.

When PDSN 130 receives the new message, PDSN 130 identifies the time stamp in the new message. PDSN 130 also stores the previous time stamp from a previous message in time stamp memory 134. PDSN 130 compares the time stamp from the new message to the previous time stamp stored in time stamp memory 134. If the time stamp from the new message comprises a monotonically increasing time stamp as compared to the previous time stamp, then PDSN 130 accepts the new message as a valid message. If the time stamp from the new message does not comprise a monotonically increasing time stamp as compared to the previous time stamp, then PDSN 130 transmits a mismatch message to PCF 110.

One problem with PDSNs requiring monotonically increasing time stamps is that the TOD clocks in PCFs are not very accurate. PCF 110 is typically a stratum-4 client, meaning that NTP process 118 in PCF 110 synchronizes TOD clock 122 with a stratum-3 client, which synchronizes with a stratum-2 client, which synchronizes with a stratum-1 client, which synchronizes with a reference time. If NTP process 118 determines that TOD clock 122 has drifted by a threshold, then NTP process 118 adjusts TOD clock 122 to synchronize TOD clock 122.

If NTP process 118 corrects TOD clock 122 back in time, then PCF 110 may generate time stamps that are not monotonically increasing. For instance, assume that PCF 110 time stamps a first message with "10:00:30". Subsequently, NTP process 118 determines that TOD clock 122 has drifted forward in time by 20 seconds. NTP process 118 adjusts TOD clock 122 so that TOD clock 122 is 20 seconds slower. If PCF 110 then transmits a second message, PCF 110 time stamps the second message with "10:00:10". PDSN 130 will identify that the time stamp of the second message is not monotonically increasing, and will transmit a mismatch message to PCF 110.

Figure 2:
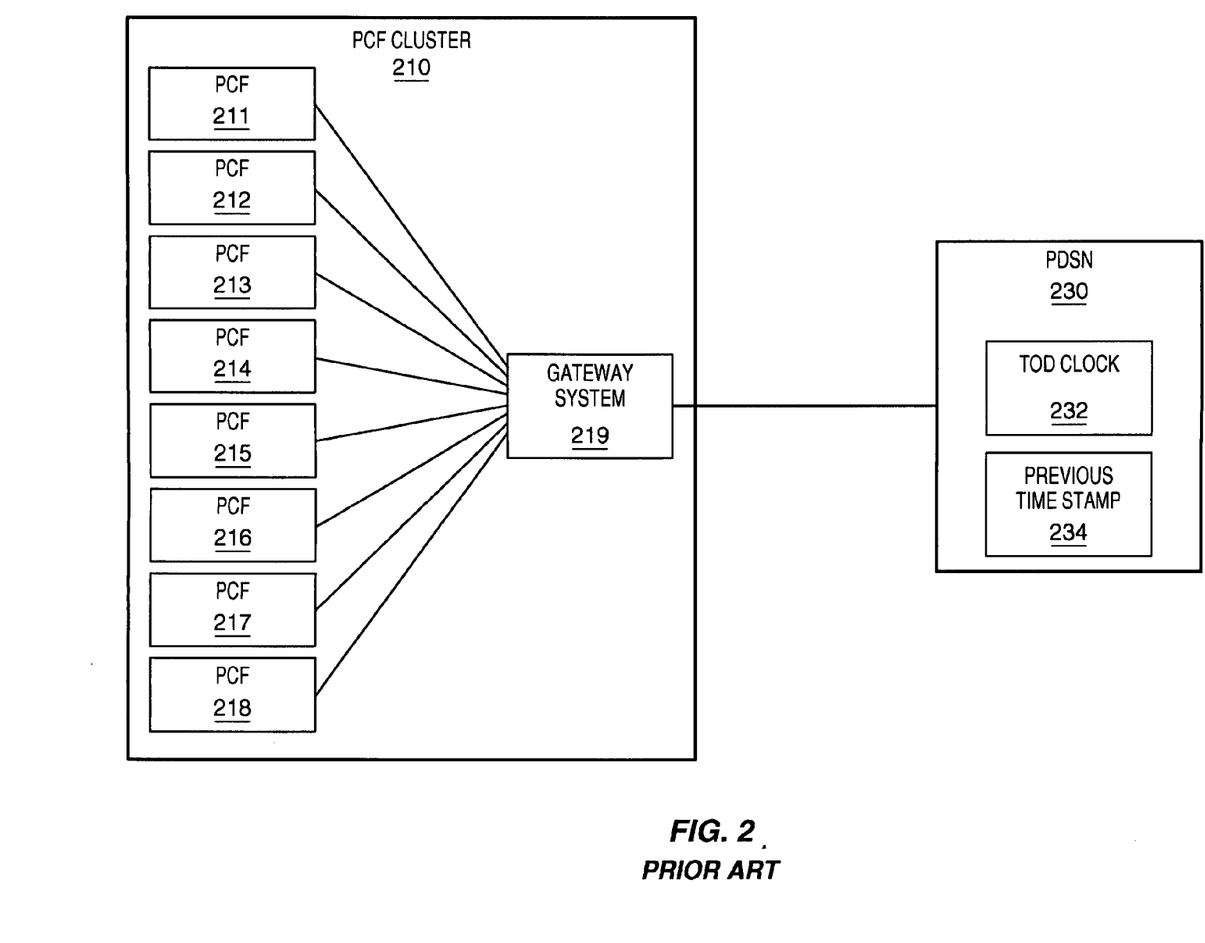
FIG. 2 illustrates a PCF cluster connected to a PDSN in the prior art.

PCF clusters are being introduced that include a plurality of parallel-operating PCFs. FIG. 2 illustrates a PCF cluster 210 connected to a PDSN 230 in the prior art. PCF cluster 210 includes a plurality of PCFs 211-218 and a gateway system 219. Gateway system 219 interfaces PCFs 211-218 with PDSN 230 using a single network address. To PDSN 230, PCF cluster 210 appears as a single logical PCF.

PDSN 230 may require monotonically increasing time stamps on a per-session basis or a per-IP address basis. On a per-session basis, PDSN 230 requires monotonically increasing time stamps for messages of a session of a single PCF 211-218. Each of PCFs 211-218 provides service for many wireless packet data subscribers (not shown). PCFs 211-218 provide each subscriber with a packet data session, and PCFs 211-218 transmit messages to PDSN 230 on behalf of a session. Because each PCF 211-218 sets up individual sessions with PDSN 230, the same problems exist in PCF cluster 210 as for a single PCF to provide monotonically increasing timestamps on a per-session basis.

A particular problem arises in providing monotonically increasing time stamps for PCF cluster 210 on the per-IP address basis. Because eight PCFs 211-218 are sharing a single IP address in PCF cluster 210, time stamps from all of the PCFs 211-218 need to be monotonically increasing. The TOD clocks in PCFs 211-218 are not synchronized and may vary significantly from one another due to the inaccuracies of the TOD clocks. If the TOD clocks are not synchronized, then PCF cluster 210 will have a difficult time transmitting messages with monotonically increasing time stamps. This will result in PDSN 230 returning many mismatch messages.

The same problems exist for any set of peer devices having inaccurate TOD clocks that need to provide monotonically increasing time stamps.

SUMMARY OF THE SOLUTION

The invention solves the above problems and other problems with an adaptive algorithm process that allows a set of peer devices to provide monotonically increasing time stamps. If the peer devices have inaccurate time of day (TOD) clocks, the adaptive algorithm process allows the peer devices to provide monotonically increasing time stamps without requiring expensive hardware on each peer device or requiring an additional network element (or elements) that can impact performance.

In one embodiment of the invention, a communication network includes a first communication node connected to a second communication node. The first communication node includes a plurality of peer devices. Each of the peer devices is assumed to have an inaccurate TOD clock, but it is not necessary for the invention. The first communication node and the second communication node communicate according to a protocol that requires the first communication node to transmit messages to the second communication node with monotonically increasing time stamps. The second communication node also communicates with the peer devices in the first communication node according to a common network address. Thus, the peer devices appear as a single logical node to the second communication node.

Each of the peer devices is adapted to perform as follows. When in operation, a peer device transmits a message to the second communication node with a time stamp. The peer device generates the time stamp based on a TOD clock in the peer device. The second communication node receives the message with the time stamp. The second communication node determines if the time stamp comprises an increasing time stamp with respect to a previous time stamp, and generates an error response if the time stamp does not comprise an increasing time stamp.

According to the adaptive algorithm process, if the peer device receives an error response from the second communication node indicating that the time stamp does not comprise an increasing time stamp, then the peer device increases the time stamp. Increasing the time stamp may comprise adding an offset to the TOD clock. The peer device then transmits (or re-transmits) the message to the second communication node with the increased time stamp. This process continues each time the peer device receives an error response from the second communication node until the time stamp is increased sufficiently to comprise a monotonically increasing time stamp to the second communication node.

The adaptive algorithm process advantageously synchronizes the time stamps of each of the peer devices. Thus, the adaptive algorithm process allows the set of peer devices to provide monotonically increasing time stamps. The adaptive algorithm process works based on error responses from the second communication node. No new hardware or network elements are needed to synchronize the time stamps of the peer devices.

The invention may include other exemplary embodiments described below.

DESCRIPTION OF THE DRAWINGS

The same reference number represents the same element on all drawings.

DETAILED DESCRIPTION OF THE INVENTION

FIGS. 3-9 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 3:
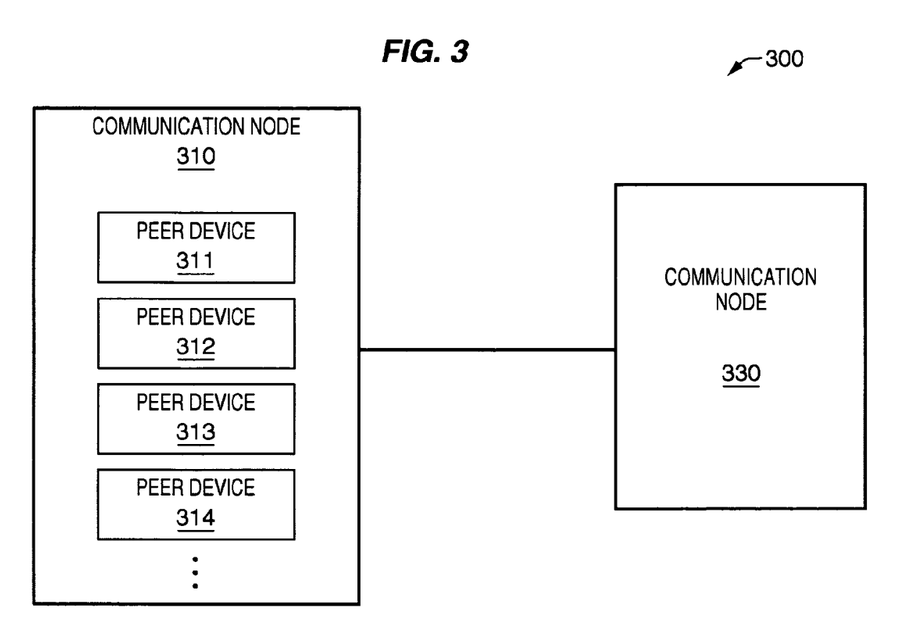
FIG. 3 illustrates a communication network in an exemplary embodiment of the invention.

FIG. 3 illustrates a communication network 300 in an exemplary embodiment of the invention. Communication network 300 may comprise a wireless network, a portion of a wireless network, or another type of network. Communication network 300 includes a first communication node 310 connected to a second communication node 330. Communication node 310 includes a plurality of peer devices 311-314. Peer devices 311-314 may comprise cards, processes, servers, systems, or any type of device. Although four peer devices 311-314 are shown, communication node 310 may include more or less peer devices. Communication network 300 may include other components, devices, or systems not shown in FIG. 3.

Each of peer devices 311-314 is assumed to have an inaccurate TOD clock (not shown), but it is not necessary for the invention. Communication node 310 and communication node 330 communicate according to a protocol that requires communication node 310 to transmit messages to communication node 330 with monotonically increasing time stamps. Communication node 330 also communicates with peer devices 311-314 in communication node 310 according to a common network address. For instance, each of peer devices 311-314 transmits messages to communication node 330 using the same IP address. Thus, peer devices 311-314 appear as a single logical node to communication node 330.

Figure 4:
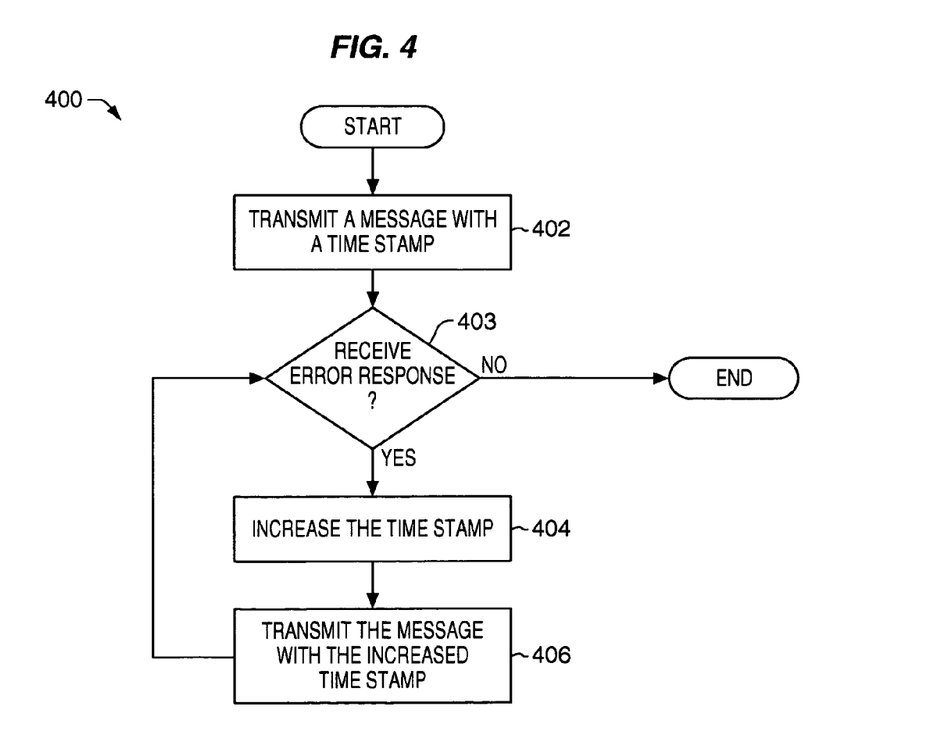
FIG. 4 is a flow chart illustrating a method of operating each peer device in a communication node in an exemplary embodiment of the invention.

FIG. 4 is a flow chart illustrating a method 400 of operating each peer device 311-314 in communication node 310 in an exemplary embodiment of the invention. In step 402, a peer device (assume peer device 311 in this embodiment) transmits a message to communication node 330 with a time stamp. Peer device 311 generates the time stamp based on a time of day (TOD) clock (not shown) in peer device 311. Communication node 330 receives the message with the time stamp. Communication node 330 determines if the time stamp comprises an increasing time stamp with respect to a previous time stamp, and generates an error response if the time stamp does not comprise an increasing time stamp.

According to an adaptive algorithm process illustrated by steps 403, 404, and 406, if peer device 311 receives an error response from communication node 330 in step 403 indicating that the time stamp does not comprise an increasing time stamp, then peer device 311 increases the time stamp in step 404. Increasing the time stamp may comprise adding an offset to the TOD clock in peer device 311. Peer device 311 may increase the time stamp to the next second window. For instance, if the previous time stamp was 10:00:10, then increasing the time stamp to the next second window would be to 10:00:11. Peer device 311 then transmits the message to communication node 330 with the increased time stamp in step 406.

Method 400 then returns to step 403 if peer device 311 receives another error response from communication node 330. This process continues each time peer device 311 receives an error response from communication node 330 until the time stamp is increased sufficiently to comprise a monotonically increasing time stamp to communication node 330. If peer device 311 does not receive an error response back from communication node 330, then the last time stamp of peer device 311 comprises an increasing time stamp as required. The offset needed to generate the last time stamp in peer device 311 is stored and used with the TOD clock to generate future time stamps. The offset is also periodically decreased so as to prevent the offset from growing too large. Large offsets can result from a "horse race" of peer devices 311-314.

Each of peer devices 311-314 operates as described above to transmit messages to communication node 330. Using the adaptive algorithm process in each peer device 311-314 synchronizes the time stamps of peer devices 311-314. Thus, the adaptive algorithm process allows communication node 310 to provide monotonically increasing time stamps. Even though the individual TOD clocks in peer devices 311-314 are not synchronized, the time stamps generated by peer devices 311-314 are advantageously "synchronized" to provide monotonically increasing time stamps to communication node 330. Peer devices 311-314 are able to operate in parallel without highly accurate TOD clocks, because the adaptive algorithm process works based on error responses from communication node 330. No new hardware or network elements are needed to synchronize the time stamps of peer devices 311-314.

Figure 5:
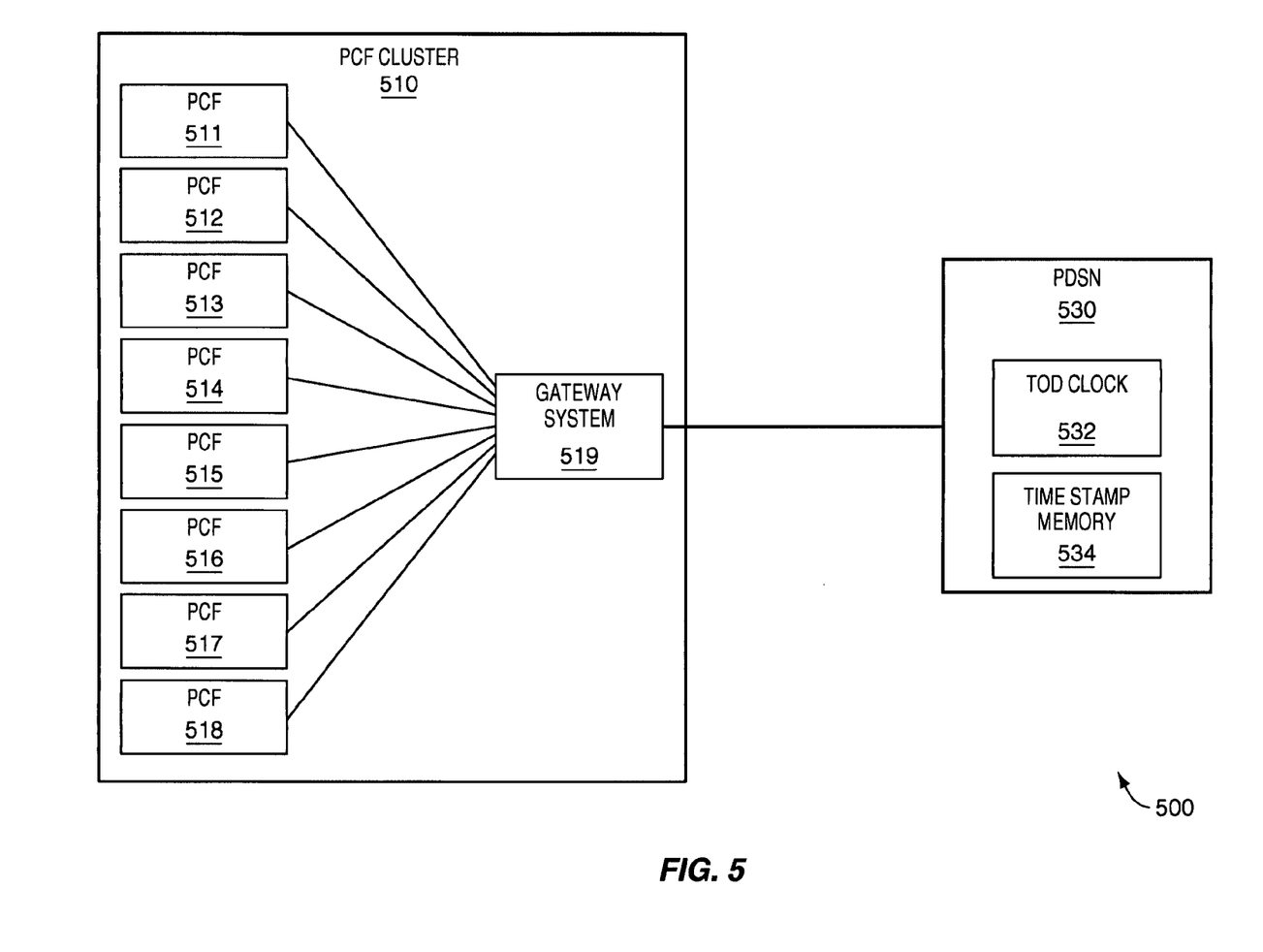
FIG. 5 illustrates a portion of a wireless network in an exemplary embodiment of the invention.

One example of a communication node comprised of a plurality of peer devices is a PCF cluster including a plurality of PCFs in a wireless network. FIG. 5 illustrates a portion of a wireless network 500 in an exemplary embodiment of the invention. Wireless network 500 includes a PCF cluster 510 and a PDSN 530. PCF cluster 510 includes a plurality of PCFs 511-518 and a gateway system 519. Gateway system 519 interfaces PCFs 511-518 with PDSN 530 with a single IP address. To PDSN 530, PCF cluster 510 appears as a single logical PCF. PDSN 530 includes a TOD clock 532 and a time stamp memory 534 for storing previous time stamps. Wireless network 500 may include other components, devices, or systems not shown in FIG. 5.

PCF cluster 510 and PDSN 530 communicate according to a messaging protocol, such as TIA/EIA/IS-2001, that requires PCFs 511-518 to provide monotonically increasing time stamps in messages transmitted to PDSN 530. PDSN 530 requires the monotonically increasing time stamps on a per-IP address basis in this embodiment. Each PCF 511-518 uses the same IP address to transmit messages to PDSN 530. The messages include an ID field where a time stamp is inserted. When any of PCFs 511-518 transmits a new message to PDSN 530, that PCF inserts a time stamp in the ID field of the new message. The time stamp is based on a TOD clock in the PCF.

Figure 6:
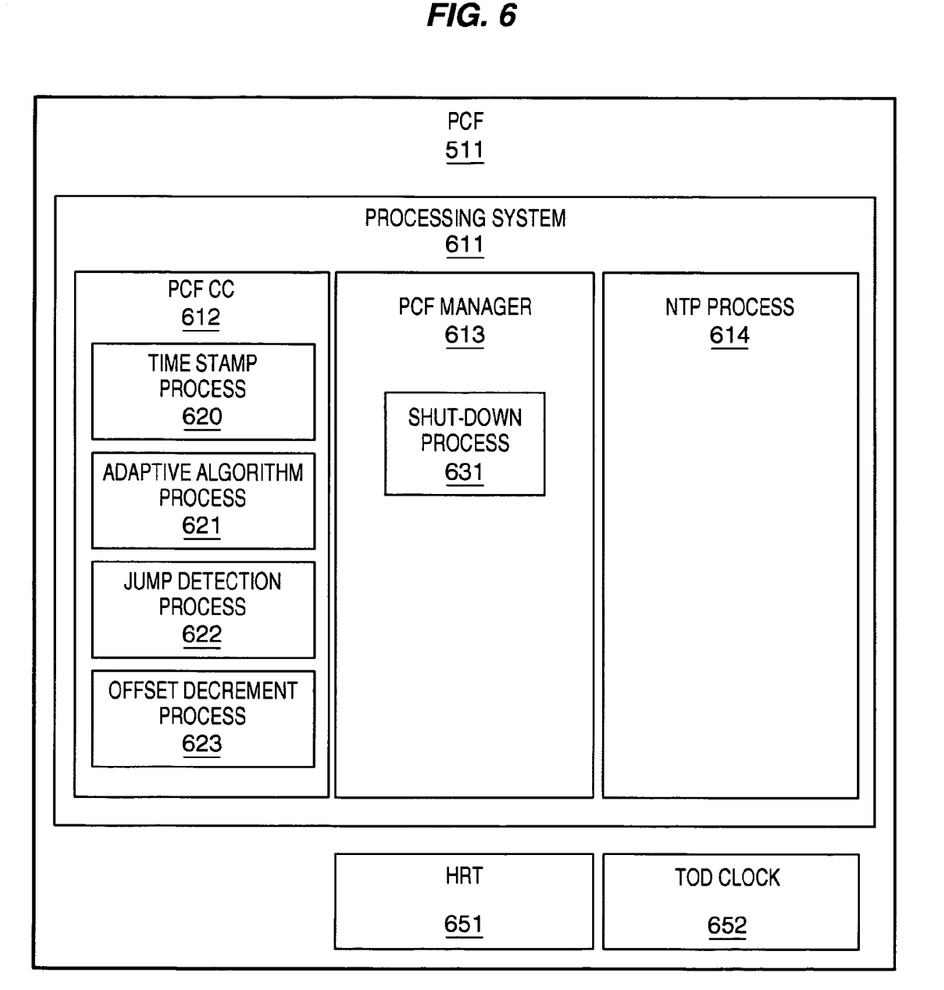
FIG. 6 illustrates a PCF in an exemplary embodiment of the invention.

FIG. 6 illustrates a PCF 511 in an exemplary embodiment of the invention. The configuration of PCF 511 is just one embodiment and PCF 511 is not limited to this embodiment. PCFs 512-518 may have configurations similar to the configuration in FIG. 6.

PCF 511 includes a processing system 611, a high resolution timer (HRT) 651, and a time of day (TOD) clock 652. Processing system 611 executes a PCF call control (PCF CC) process 612, a PCF manager process 613, and an NTP process 614. Processing system 611 may comprise a single processor on a PCF card, or multiple processors operating in parallel.

PCF call control process 612 includes a time stamp process 620, an adaptive algorithm process 621, a jump detection process 622, and an offset decrement process 623. PCF manager 613 includes a shut-down process 631. TOD clock 652 is configured to provide a time of day. HRT 651 is a highly accurate timer resident on most PCF cards.

As with previous PCFs, NTP process 614 is a process that tries to synchronize TOD clock 652 with a reference time. If TOD clock 652 drifts by a threshold amount, then NTP process 614 adjusts TOD 652 to synchronize TOD clock 652 with a reference time. Each PCF 512-518 has a TOD clock that is synchronized by an NTP process. PCF 511, and the other PCFs 512-518, is assumed to have an inaccurate TOD clock 652, but it is not necessary for the invention.

Shut-down process 631 is a process used to ensure that TOD clock 652 does not drift beyond a threshold. Shut-down process 631 monitors TOD clock 652 and NTP process 614. If TOD clock 652 drifts beyond a threshold, then shut-down process 631 takes PCF 511 out of service. For instance, in this embodiment, the threshold is set to 20 seconds. If TOD clock 652 drifts +/−20 seconds, then shut-down process 631 takes PCF 511 out of service. The same takes place for each PCF 511-518 in PCF cluster 510. Thus, the TOD clocks in PCFs 511-518 will all be in a +/−20 second window, and any two PCFs 511-518 will be at most 40 seconds apart.

Assume that PCF 511 needs to transmit a request message to PDSN 530 (refer to FIGS. 5 and 6). As previously stated, PDSN 530 requires a monotonically increasing time stamp in the messages. Therefore, PCF call control process 612 executes time stamp process 620 to generate a time stamp to insert in the ID field of the request message. Time stamp process 620 generates the time stamps based on TOD clock 652. Time stamp process 620 may increase or decrease the time stamp with respect to TOD clock 652 based on an offset. For this request message, assume that time stamp process 620 uses the time of day from TOD clock 652 for the time stamp (i.e., offset of zero). PCF 511 then transmits the request message to PDSN 530 through gateway system 519.

PDSN 530 receives the request message and identifies the time stamp in the request message. PDSN 530 also stores a previous time stamp from a previous request message in time stamp memory 534. PDSN 530 compares the time stamp from the request message to the previous time stamp stored in time stamp memory 534. If the time stamp from the request message comprises a monotonically increasing time stamp as compared to the previous time stamp, then PDSN 530 accepts the request message as a valid message. If the time stamp from the request message does not comprise a monotonically increasing time stamp as compared to the previous time stamp, then PDSN 530 transmits a mismatch message to PCF 511 through gateway system 519.

Figure 7:
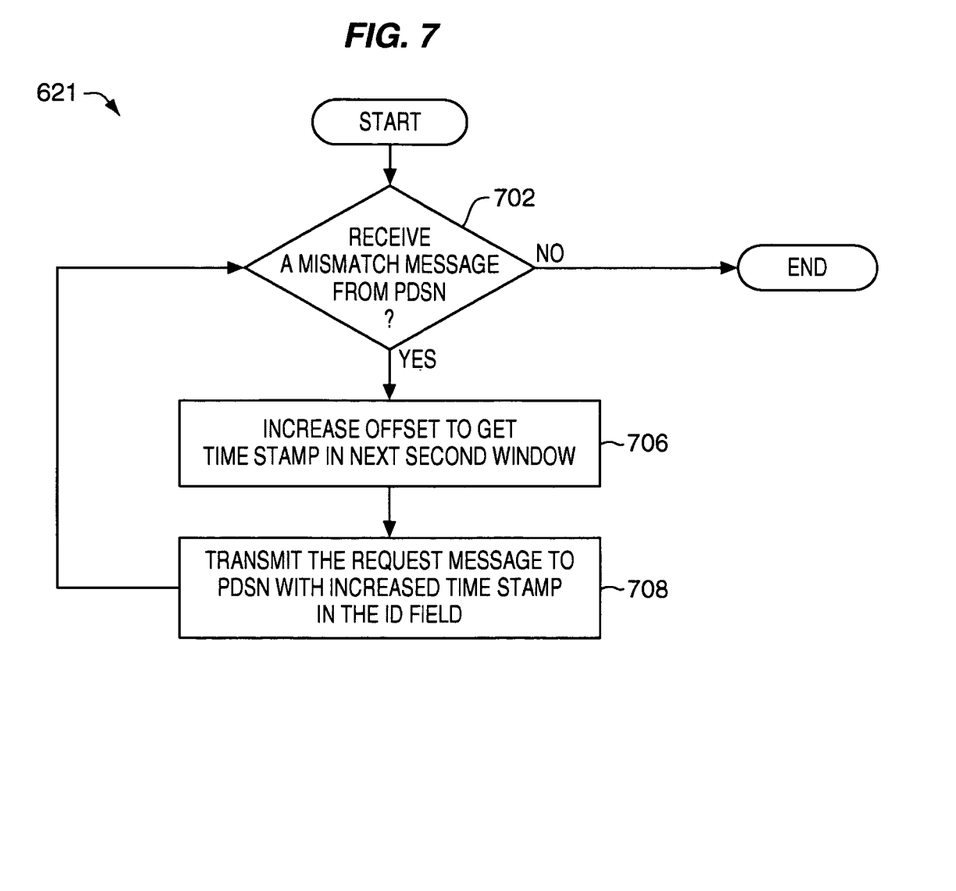
FIG. 7 is a flow chart illustrating an adaptive algorithm process in an exemplary embodiment of the invention.
Figure 8:
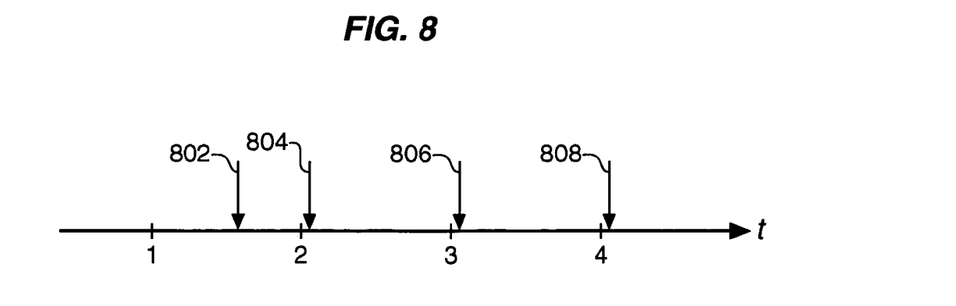
FIG. 8 is a time line illustrating how a time stamp is increased in an exemplary embodiment of the invention.

Responsive to receiving the mismatch message, processing system 611 executes adaptive algorithm process 621. FIG. 7 is a flow chart illustrating the adaptive algorithm process 621 in an exemplary embodiment of the invention. If a mismatch message is received from PDSN 530 in step 702, then processing system 611 increases the offset ($\Delta$) in time stamp process 620 in step 706. Processing system 611 increases the offset so that time stamp process 620 generates an increased time stamp (TOD+$\Delta_1$) in the next second window. FIG. 8 is a time line illustrating how the time stamp is increased in an exemplary embodiment of the invention. Assume that the request message transmitted to PDSN 530 was time stamped with time 802. In step 706 of adaptive algorithm process 621, processing system 611 increases the offset so that time stamp process 620 generates a time stamp in the next second window, which is time 804. Subsequent second windows would be time 806, followed by time 808, and so on. A second window is a time frame beginning with the start of a whole second and ending with the beginning of the next whole second.

Referring again to FIG. 7, processing system 611 inserts the increased time stamp (TOD+$\Delta_1$) in the ID field of the request message, and transmits the request message to PDSN 530 with the increased time stamp (TOD+$\Delta_1$) in step 708. Adaptive algorithm process 621 then repeats from step 702 until the time stamp is increased sufficiently to comprise a monotonically increasing time stamp to PDSN 530.

Assume for illustration that PCF 511 receives back another mismatch message. According to adaptive algorithm process 621, processing system 611 again increases the offset in time stamp process 620 so that time stamp process 620 generates an increased time stamp (TOD+$\Delta_2$) in the next second window. Processing system 611 inserts the increased time stamp (TOD+$\Delta_2$) in the ID field of the request message, and transmits the request message to PDSN 530 with the increased time stamp (TOD+$\Delta_2$).

If PCF 511 receives back another mismatch message, then processing system 611 again increases the offset in time stamp process 620 so that time stamp process 620 generates an increased time stamp (TOD+$\Delta_3$) in the next second window. Processing system 611 inserts the increased time stamp (TOD+$\Delta_3$) in the ID field of the request message, and transmits the request message to PDSN 530 with the increased time stamp (TOD+$\Delta_3$).

Assume that adaptive algorithm process 621 continues until time stamp process 620 increases offset to $\Delta_7$. When processing system 611 time stamps the request message with TOD+$\Delta_7$, PDSN 530 recognizes this time stamp as a monotonically increasing time stamp and does not return a mismatch message. Time stamp process 620 stores the offset of $\Delta_7$ for use in future time stamps.

The above description assumes that PDSN 530 is sensitive down to the granularity of seconds. Adaptive algorithm process 621 also works for other granularities, such as sub-seconds, as long as the PCFs 511-518 know the granularity. For example, PCF 511 could increment the offset ($\Delta$) by 100 ms after receiving a mismatch message, if it was known that PDSN 530 sensitivity was 100 ms.

Adaptive algorithm process 621 is used in each PCF 511-518 to "synchronize" the time stamp processes 620 of the PCFs 511-518. The TOD clocks of each PCF 511-518 are not actually synchronized, but adaptive algorithm process 621 allows PCFs 511-518 to generate "synchronized" time stamps without having synchronized TOD clocks.

Because time stamp process 620 generates time stamps based on TOD clock 652 and an offset (TOD+$\Delta$), a change in TOD clock 652 may adversely affect time stamp process 620 and adaptive algorithm process 621. For instance, if NTP process 614 were to adjust TOD clock 652 ahead by 20 seconds, then time stamp process 620, using the last offset ($\Delta_7$), would be 20 seconds faster than desired. The adaptive algorithm processes in the other PCFs would try to catch up to time stamp process 620 to have monotonically increasing time stamps, which causes all of the PCFs to race ahead.

Figure 9:
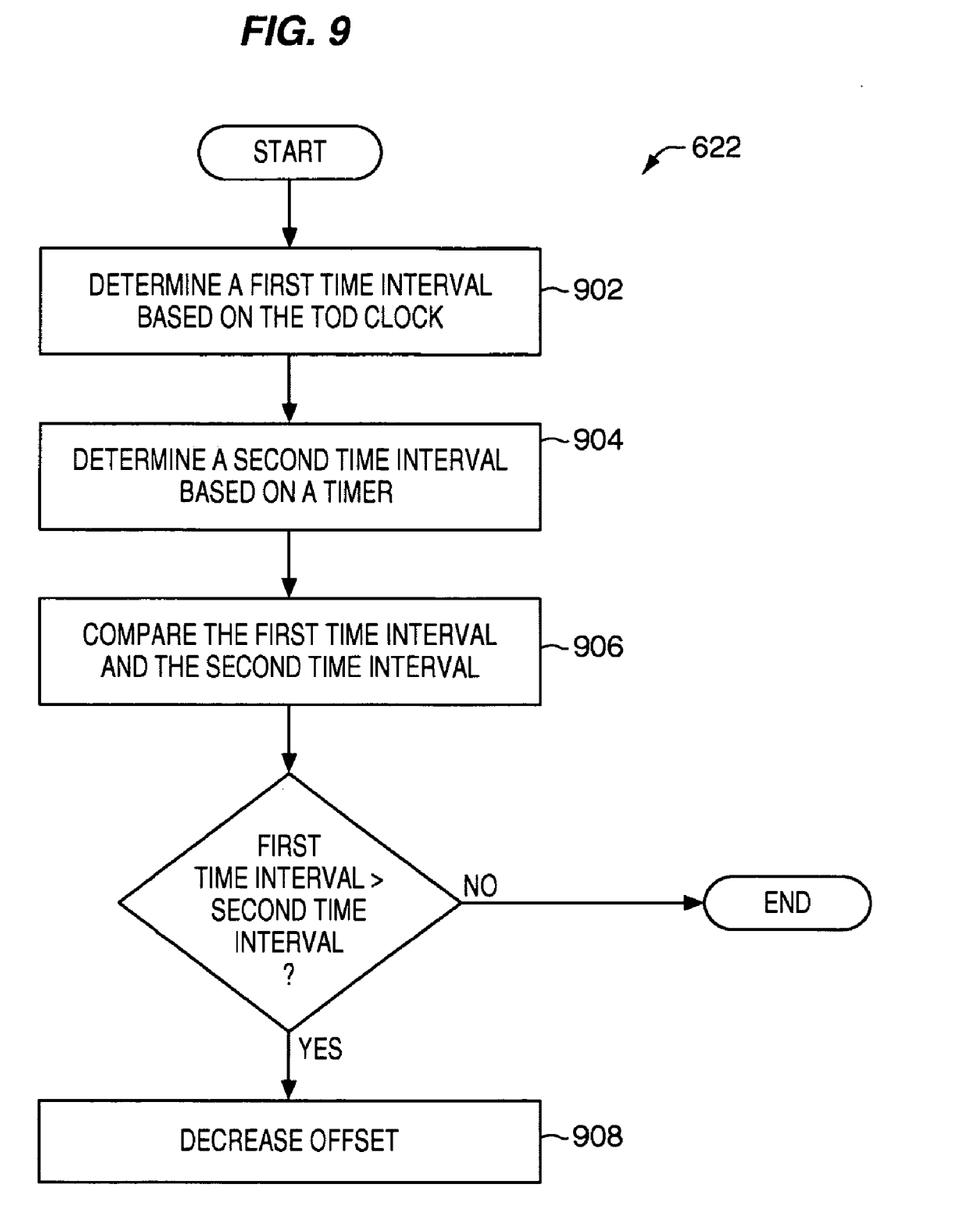
FIG. 9 is a flow chart illustrating a jump detection process in an exemplary embodiment of the invention.

To solve this problem, jump detection process 622 identifies when TOD clock 652 jumps forward in time. FIG. 9 is a flow chart illustrating jump detection process 622 in an exemplary embodiment of the invention. In step 902, jump detection process 622 determines a first time interval based on TOD clock 652. In step 904, jump detection process 622 determines a second time interval based on HRT 651. In step 906, jump detection process 622 compares the first time interval and the second time interval. If the first time interval (from the TOD clock 652) is greater than the second time interval (from the HRT 651) by a particular threshold, then processing system 611 determines that TOD clock 652 has jumped forward in time. If the first time interval and the second time interval differ by 1 millisecond, then the threshold probably has not been reached. If the first time interval and the second time interval differ by 10 seconds, then the threshold probably has been reached.

If the threshold has been reached, processing system 611 decreases the offset ($\Delta$) in time stamp process 621 in step 908. Processing system 611 may decrease the offset to zero or some other designated amount. Jump detection process 622 may be run periodically, responsive to transmitting messages, or any other time.

The following is an example illustrating the jump detection process 622. Assume that PCF 511 transmits a first message with a time stamp based on a first TOD. Jump detection process 622 stores the first TOD, and starts a counter with HRT 651. HRT 651 provides accurate count over small time intervals. HRT 651 is also immune from TOD jumps because it is independent from TOD clock 652. When PCF 511 is to transmit a second message, jump detection process 622 identifies a second TOD from TOD clock 652. Jump detection process 622 determines a first time interval based on the first TOD and the second TOD from the TOD clock 652. Jump detection process 622 also stops the counter with HRT 651, and calculates a second time interval based on the count from HRT 651. Jump detection process 622 then compares the first time interval and the second time interval. If the first time interval (from the TOD clock 652) is greater than the second time interval (from the HRT 651) by a particular threshold, then jump detection process 622 determines that TOD clock 652 has jumped forward in time. If the threshold has been reached, jump detection process 622 can stop the second message from being transmitting and can decrease the offset.

Processing system 611 also executes an offset decrement process 623. Offset decrement process 623 is used to prevent all of the PCFs 511-518 from increasing their offsets and begin racing one another. The offsets may grow out of control. Therefore, offset decrement process 623 builds in a "leaky bucket" for the offsets. In executing offset decrement process 623, processing system 611 periodically decreases the offset in time stamp process 620. Processing system 611 decreases the offset by a designated amount to help counteract the adaptive algorithm process 621 that is adding to the offset so the offset cannot race out of control.

The following lists some other solutions for synchronizing the time stamps of peer devices. Although the advantages of the solution provided above will be evident, the following solutions are also part of the invention to solve the problems in the art.

In one other solution, a new and accurate time of day (TOD) source (new hardware) is added in addition to the peer devices. The peer devices are assumed to be connected to the new TOD clock through a back plane or similar connection. Immediately before sending a message, each peer device would access the new TOD source, such as through a shared memory location, to obtain a time stamp. The time stamps from all of the peer devices would be from the new TOD source, and would thus be synchronized.

In another solution, a new and accurate time of day (TOD) source (new hardware) is again added in addition to the peer devices. Each peer device would synchronize with the TOD source. Therefore, each peer device would have synchronized TOD clocks and would be able to provide monotonically increasing time stamps.

In another solution, a new proxy device (new network element) is added in addition to the peer devices. Each peer device would generate a message, and transmit the message to the proxy device. The proxy device would then time stamp the message and forward the message. Because each peer device uses the proxy device to time stamp messages, the peer devices would be able to provide monotonically increasing time stamps.

In another solution, a new centralized device (new network element) is added in addition to the peer devices. Immediately before sending a message, each peer device would request a time stamp from the centralized device. Because each peer device uses the centralized device to generate time stamps, the peer devices would be able to provide monotonically increasing time stamps.

We claim:

1. A communication network, comprising:
a first communication node comprising a plurality of peer devices; and
a second communication node that communicates with the peer devices in the first communication node according to a common network address;
each of the peer devices is adapted to transmit a message to the second communication node with a time stamp that is based on a time of day (TOD) clock, and responsive to receiving an error response from the second communication node indicating that the time stamp does not comprise an increasing time stamp, each of the peer devices are further adapted to increase the time stamp by adding an offset to the TOD clock, to transmit the message to the second communication node with the increased time stamp, and to repeatedly increase the time stamp by adding a larger offset to the TOD clock and transmit the message to the second communication node responsive to receiving error response messages until the increased time stamp comprises a monotonically increasing time stamp to the second communication node.

2. The communication network of claim 1 wherein the second communication node requires that the first communication node transmit messages to the second communication node with monotonically increasing time stamps.

3. The communication network of claim 1 wherein:
the second communication node receives the message with the time stamp, determines if the time stamp comprises an increasing time stamp with respect to a previous time stamp, and generates the error response if the time stamp does not comprise an increasing time stamp.

4. The communication network of claim 1 wherein each of the peer devices is adapted to increase the time stamp to the next second window to generate the increased time stamp.

5. The communication network of claim 1 wherein each of the peer devices is adapted to:
determine a first time interval based on the TOD clock;
determine a second time interval based on a timer independent from the TOD clock;
compare the first time interval and the second time interval to determine if the TOD clock has jumped forward in time; and
decrease the offset a designated amount responsive to determining that the TOD clock jumped forward in time.

6. The communication network of claim 1 wherein each of the peer devices is adapted to periodically decrease the offset.

7. The communication network of claim 1 wherein the peer devices of the first communication node comprise Packet Control Functions (PCF) and the second communication node comprises a Packet Data Serving Node (PDSN).

8. A method of operating a first communication node comprising a plurality of peer devices, the peer devices in the first communication node communicate with a second communication node according to a common network address, the method comprising:
in each of the peer devices, transmitting a message to the second communication node with a time stamp that is based on a time of day (TOD) clock;
responsive to receiving an error response from the second communication node indicating that the time stamp does not comprise an increasing time stamp, the method further comprises;
increasing the time stamp by adding an offset to the TOD clock;
transmitting the message to the second communication node with the increased time stamp; and
repeatedly increasing the time stamp by adding a larger offset to the TOD clock and transmitting the message to the second communication node responsive to receiving error response messages until the increased time stamp comprises a monotonically increasing time stamp to the second communication node.

9. The method of claim 8 wherein the second communication node requires that the first communication node transmit messages to the second communication node with monotonically increasing time stamps.

10. The method of claim 8 wherein increasing the time stamp comprises:
increasing the time stamp to the next second window to generate the increased time stamp.

11. The method of claim 8 further comprising, for each peer device:
determining a first time interval based on the TOD clock;
determining a second time interval based on a timer independent from the TOD clock;
comparing the first time interval and the second time interval to determine if the TOD clock has jumped forward in time; and
decreasing the offset a designated amount responsive to determining that the TOD clock jumped forward in time.

12. The method of claim 8 further comprising:
periodically decreasing the offset in each of the peer devices.

13. A Packet Control Function (PCF) cluster, comprising:
a plurality of PCFs; and
a gateway system adapted to interface the plurality of PCFs with a Packet Data Serving Node (PDSN) according to a common network address, wherein the PDSN requires that the PCF cluster transmits messages with monotonically increasing time stamps;
each of the plurality of PCFs is adapted to generate a time stamp based on a time of day (TOD) clock and an offset, transmit a request message with the time stamp to the PDSN, and responsive to receiving mismatch messages from the PDSN indicating that the time stamp does not comprise an increasing time stamp, increase the offset to generate an increased time stamp, and transmit the request message to the PDSN with the increased time stamp until the increased time stamp comprises a monotonically increasing time stamp to the PDSN.

14. The PCF cluster of claim 13 wherein each of the plurality of PCFs is adapted to increase the offset to generate the increased time stamp in the next second window.

15. The PCF cluster of claim 13 wherein each of the plurality of PCFs is adapted to:
take itself out of service if the TOD clock drifts by a threshold amount.

16. The PCF cluster of claim 13 wherein each of the plurality of PCFs is adapted to:
determine a first time interval based on the TOD clock;
determine a second time interval based on a timer independent from the TOD clock;
compare the first time interval and the second time interval to determine if the TOD clock has jumped forward in time; and
decrease the offset a designated amount responsive to determining that the TOD clock jumped forward in time.

17. The PCF cluster of claim 16 wherein each of the plurality of PCFs is further adapted to:
   decrease the offset to zero responsive to determining that the TOD clock jumped forward in time.

18. The PCF cluster of claim 13 wherein each of the plurality of PCFs is adapted to:
   periodically decrease the offset.

* * * * *

UNITED STATES PATENT AND TRADEMARK OFFICE
CERTIFICATE OF CORRECTION

PATENT NO. : 7,630,383 B2
APPLICATION NO. : 11/092330
DATED : December 8, 2009
INVENTOR(S) : Noel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1209 days.

Signed and Sealed this

Second Day of November, 2010

David J. Kappos
*Director of the United States Patent and Trademark Office*